Figure 1:
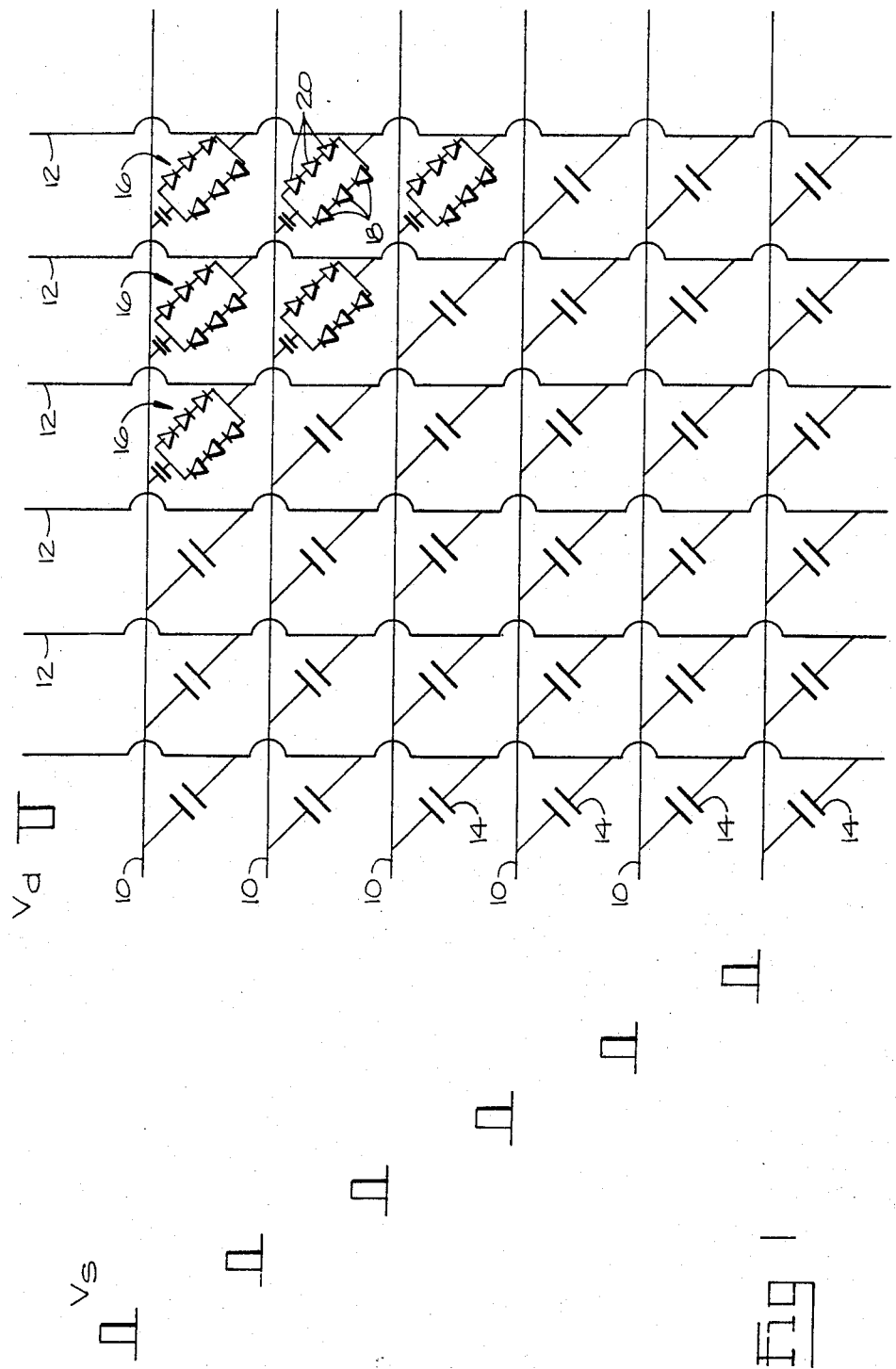

United States Patent [19]
Miner et al.

[11] 4,251,136
[45] Feb. 17, 1981

[54] LCDS (LIQUID CRYSTAL DISPLAYS) CONTROLLED BY THIN FILM DIODE SWITCHES

[75] Inventors: Carla J. Miner, Nepean; David R. Baraff, Ottawa; Nur M. Serinken, Kanata; Richard W. Streater; Vladimir F. Drobny, both of Ottawa, all of Canada

[73] Assignee: Northern Telecom Limited, Montreal, Canada

[21] Appl. No.: 60,274

[22] Filed: Jul. 25, 1979

[51] Int. Cl.³ .............................................. G02F 1/133
[52] U.S. Cl. ...................................... 350/334; 357/4; 357/76; 340/719; 340/784
[58] Field of Search ............... 350/334, 339 R; 357/4, 357/76; 340/719, 784, 785

[56] References Cited
U.S. PATENT DOCUMENTS

| | | | |
|---|---|---|---|
| 3,593,107 | 7/1971 | Chilton et al. | 357/80 |
| 3,730,607 | 5/1973 | Grobmaier et al. | 350/339 R |
| 3,824,003 | 7/1974 | Koda et al. | 350/334 X |
| 3,862,360 | 1/1975 | Dill et al. | 350/334 X |
| 4,042,293 | 8/1977 | Hanak et al. | 350/339 R |
| 4,198,630 | 4/1980 | Serinken et al. | 350/339 R X |
| 4,204,217 | 5/1980 | Goodman | 350/334 X |
| 4,223,308 | 9/1980 | Boraff et al. | 340/719 |

FOREIGN PATENT DOCUMENTS

2460916  7/1975  Fed. Rep. of Germany ...... 350/339 R

*Primary Examiner*—Edward S. Bauer
*Attorney, Agent, or Firm*—Sidney T. Jelly

[57] ABSTRACT

A matrix multiplexed display cell has thin film switch devices at matrix crosspoints to provide a turn-on threshold for electrooptic liquid used in the cell. Each of the switch devices has two parallel branches of diodes, the diodes in one branch being of reverse polarity to those in the other. The cell is operated at low current so that the switch devices, which are deposited on glass, do not degrade rapidly in use.

12 Claims, 2 Drawing Figures

LCDS (LIQUID CRYSTAL DISPLAYS) CONTROLLED BY THIN FILM DIODE SWITCHES

This invention relates to display cells utilizing electro-optic liquid, specifically to such display cells matrix multiplexed to a high level. Although the invention is described primarily in conjunction with a liquid crystal (LC) cell, which represents its chief intended application, it will be appreciated that it can be used to advantage with display cells using alternative electro-optic materials, specifically cells based on electrophoretic and electrochromic liquids.

In a matrix multiplexed addressing scheme for a LC display cell, a series of scan pulses, $V_s$, is, for example, applied sequentially to each of a series of row conductors, (scan lines), while a series of data pulses, $V_d$, is applied to selected ones of a series of column conductors (data lines). To turn on a LC picture element, (pel), at a selected row and column intersection, the difference between $V_s$ and $V_d$ applied to the selected row and column respectively, is made great enough to alter the LC molecular orientation, and thus the cell optical transmissivity, in a manner known in the art.

Several factors combine to limit the number of lines that can be multiplexed in a LC display cell.

Firstly, at the instant at which a pel is selected, other, non-selected pels in the selected column also experience a pulse $V_d$. For one address period, the RMS value of a.c. voltage experienced by these pels is insufficient to turn them on, but if N pels in a column are switched on and off in a single field scan, an off pel will experience $V_d$ for N address periods. This may be enough to turn the pel on. It can be shown that the ratio of RMS voltage seen by an on pel to that seen by an off pel is:

$$\frac{V_{RMS}^{ON}}{V_{RMS}^{OFF}} = \sqrt{\frac{(V_s + V_d)^2 + V_d^2(N-1)}{(V_s - V_d)^2 + V_d^2(N-1)}}$$

As N increases, the ratio becomes smaller and, since liquid crystals do not have a sharp threshold separating on and off, the contrast ratio between on and off pels becomes poorer. At certain number of row conductors, the contrast ratio becomes unacceptable.

The problem is compounded as the angle from which the cell is viewed deviates from an optimum value. Also, since the LC electro-optic response is temperature dependent, then if the LC is to be off at $V_{off}$ at high temperature, and on at $V_{on}$ at low temperature, the difference between $V_{off}$ and $V_{on}$ must be greater than for constant temperature operation.

For the above reasons, prior art limits multiplexing to about 4 lines (or 8 lines for temperature compensated display cells).

A suggestion for solving this problem proposes placing a switch in series with each pel at the intersections of the scan and data lines, such that pulses $V_d$ do not activate the switch nor the pel controlled by it whereas a selection pulse $V_s+V_d$ does activate the switch whereupon the LC or other electro-optic material experiences voltage. Such a switch should be symmetrical with respect to zero voltage since, for the purpose of preventing irreversible electro-chemical degradation of the liquid crystal, net d.c. bias should be avoided.

In its broadest aspect the invention proposes the use of a thin film device as the switch, such thin film device comprising two parallel branches of thin film diodes, the diodes of one branch being of reverse polarity to the diodes of the other branch. In operation, whichever of the branches is forward biased conducts current when the total applied voltage on the switch corresponds to the aggregate of the abrupt turn-on threshold voltages of the individual diodes. Series connected thin film diode switches can be fabricated which exhibit, in a switching regime, an increase of from 100 to 1000 times the original current passed for a doubling of voltage. This turn-on is sufficiently sharp to increase the number of multiplexed lines compared to the number permitted when no switch is used by at least a factor of 10. If, on the other hand, the number of multiplexed lines is maintained, then using thin film diode switches of this type provides a greatly increased viewing angle, contrast ratio and permitted temperature range.

Thin film diodes used in this application may be of known structure. Certain examples of homojunctions, heterostructures, metal-semiconductor junctions and metal-insulator-semiconductor devices all have demonstrably sharp enough turn-on thresholds for use in LC display matrix crosspoints.

Figure 2:
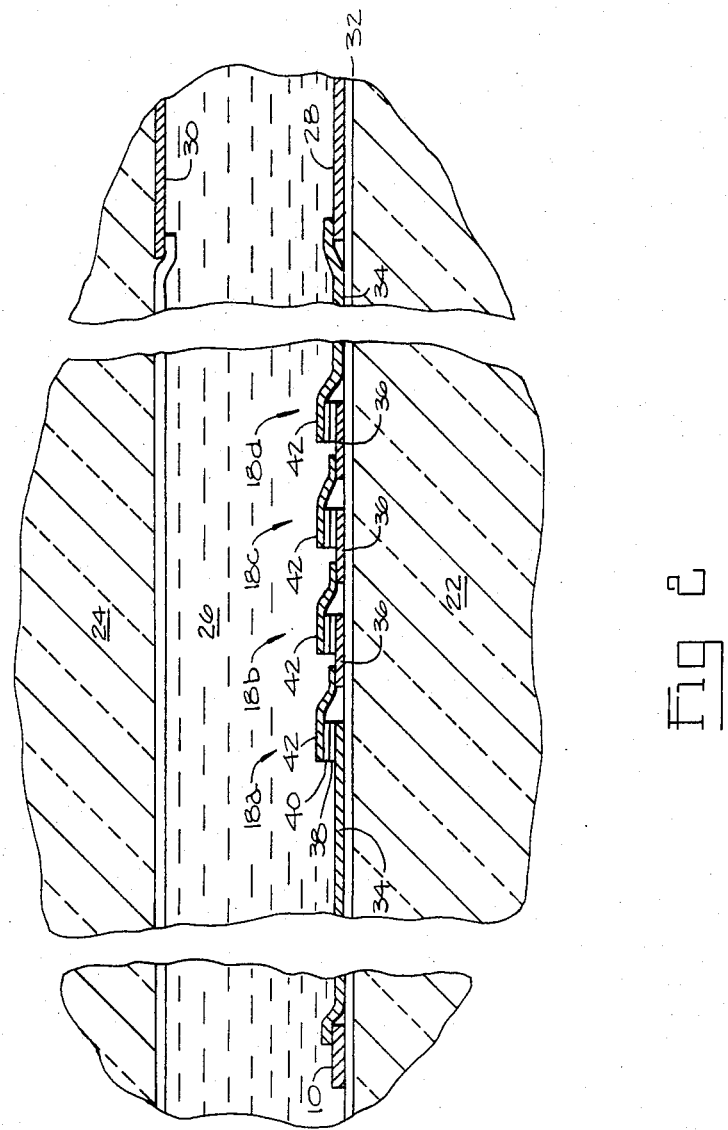

Embodiments of the invention will now be described by way of example with reference to the accompanying drawings, in which:

FIG. 1 shows in schematic form a matrix multiplexed addressing scheme for a LC display; and FIG. 2 is a sectional view (not to scale) showing part of a liquid crystal display cell using one form of thin film diode branch switch.

In a conventional matrix multiplexed addressing scheme for LC display cell, as shown at bottom left in FIG. 1, a series of scan pulses $V_s$ is, in use, applied sequentially to each row of a series of row conductors 10, called scan lines, while a series of data pulses $V_d$ is applied to selected ones of a series of column conductors 12, called data lines. If an "on" pulse is desired at a LC pel 14 at a selected row and column intersection, the difference between $V_s$ and $V_d$ applied to the selected row and column respectively is made great enough to turn on the LC pel in a manner known in the art.

As previously explained, since LC's do not have a sharp threshold separating on and off, then a pel may turn on even though not specifically addressed because it experiences data pulses $V_d$ driving other pels in the same column.

As shown at top right in FIG. 1, the invention proposes the formation of thin film switches 16 in series with each LC pel 14, each switch having a pair of parallel branches, of series connected diodes, diodes 18 of one branch, being of opposite polarity to the diodes 20 of the other branch.

Referring to FIG. 2, the liquid crystal cell comprises a pair of glass plates 22, 24 with a layer of twisted nematic LC 26 sealed between them. The inner surfaces of the plates 22, 24 are treated in a manner known in the art so as properly to orientate the LC molecules. As is well known, by applying a voltage across selected regions of the LC layer 26, the LC can be caused to undergo localized molecular reorientation with consequent alteration in optical transmissivity of the cell.

A switch 16 is sited adjacent the position of each pel 14, the pels being defined by a row-column array of indium tin oxide transparent electrodes 28 on the inside surface of plate 22 and by a corresponding array of transparent electrodes 30 on the inside surface of plate 24.

In one embodiment, to obtain hydrogenated amorphous silicon diodes of the homojunction type, the glass plates 22, 24 are first cleaned ultrasonically in soap and water, rinsed in de-ionized water and dried in isopropyl alcohol vapour. An etch protection 32 is then deposited onto the inner surfaces of the glass plates. A vapour-deposited metal layer subsequently formed on plate 22 is photodefined into row conductors 10, cross conductors 34, and bottom ohmic contact regions 36. Two layers 38, 40 of amorphous silicon having predetermined and different dopant levels are next deposited by glow discharge decomposition of silane with an appropriate dopant gas. An n-type layer is made using phosphine ($PH_3$) dopant gas and a p-type layer is made using diborane ($B_2H_6$) dopant gas. Detailed fabrication steps are described by Spear and LeComber in Philosophical Magazine, 1976, Vol. 33, No. 6, pp. 935-949. The layers are photodefined into pads, each pad partially covering one of the contact regions 36. Ohmic type contact regions 42 are then deposited on top of each pad to overlie the exposed part of the next adjacent diode bottom contact region 36. Thus, the leading diode 18a of one branch has its bottom contact region connected via a cross conductor 34 to an adjacent row conductor 10, and the top contact region of its trailing diode 20d connected to the pel electrode 38 which it controls. In the other branch, (not shown), the leading diode has its bottom contact region connected to the pel electrode and the trailing diode has its top contact region connected to the row conducor 10.

The cell is fabricated by sealing the nematic liquid crystal layer 26 between the glass plates 22 and 24. The electrodes 30 common to a particular column on the glass plate 24 are electrically connected by thin film conducting leads 12 which enable pulses to be selectively applied to LC pels 14 by applying data and scanning pulses, $V_d$ and $V_s$, to the appropriate row and column conductors 10 and 12.

In operation, the diodes 18, 20 of each switch are alternately reverse-biased since, for the purpose of preventing irreversible electro-chemical degradation of the LC 26, net d.c. bias is avoided. Thus when, say, diodes 18 are forward-biased the switch turns on only when the total applied voltage corresponds to the aggregate of the abrupt turn-on voltages of the individual diodes 18. Below this threshold, only the saturation current of the reverse-biased diodes 20 is passed.

One of the advantages of using thin film technology is that conducting regions can be sputtered or vacuum deposited with a thickness such that they are substantially transparent. Depending on the order of fabrication, the pel electrodes 28, 30 can be formed as regions of 20 Å NiCr simultaneously with the formation of one or more of the regions 36, 10 and 12.

A second suitable class of diode structures are heterojunctions of which one embodiment is a $CdS-Cu_2S$ diode. Such diodes are formed by vacuum deposition of a 2500 Å thin film of CdS followed by a film of CuCl. The structures are converted to heterojunctions by heating a 100°-200° C. for a short period of time. Ohmic bottom and top contacts are provided as described for the first embodiment. Detailed fabrication steps are described by Das et al in Thin Solid Films, Vol. 51, pp. 257-264, 1978.

A third suitable class of diode structures are metal-semiconductor junctions, one embodiment of which is fabricated by firstly depositing CdSe on a configuration of ohmic bottom contact regions as described for the first embodiment. This is annealed in air to reduce resistivity. Gold blocking contact regions are deposited over the semiconductor region as described for the first embodiment.

A fourth suitable class of diode structures are metal-insulator-semiconductor devices which are similar to the third class of devices except that an insulator layer is deposited between the metal and the semiconductor, which has the advantages of minimizing capacitance which would otherwise reduce the effectiveness of a non-linear device. In one embodiment $Al_2O_3$ insulator is formed by vacuum depositing Al at slight $O_2$ pressure. In an alternative embodiment, the insulator layer is vacuum deposited CdTe. Detailed fabrication steps are described by Muller and Zuleeg in Journal of Appl. Phys. Vol 35, No. 5 1964.

The important characteristics of the diode branches is that they should be prepared as thin film devices and should function as switches. The particular thin film techniques (sputtering, vacuum evaporation, anodization, etc) used in the formation of the diode branch layers is chosen to be compatible with the material being formed and the glass substrate material.

Using switches at matrix crosspoints, high level multiplexing (>50 lines) of a matrix addressed array of liquid crystal display picture elements can be obtained without the prior art problems of narrow viewing angle, low contrast ratio between off and on elements, and greatly limited operation temperature ranges. The diode branch switches may be used both in transmissive and reflective displays depending on the nature of the plates 22, 24 and the electrooptic liquid used. Although not illustrated, switches can be series-connected to one or both electrode of each pel, the pels thus having an associated thin film fabricated switch device on either or both of the plates 22 and 24.

Since the thin film switches are very much less than 10 microns in thickness, i.e. at most 1 micron, their presence on the transparent plates flanking the LC material does not prevent the use of a correspondingly thin layer of LC material as would thick film devices. In turn, and assuming the resistance of the LC material is very high, of the order of $10^{10}$ ohmcm., then current through the diode branch which is to charge the LC is minimized. Coupled with the fact that such switches show their threshold switching characteristics at very low currents, of the order of 1-100 nA, it will be appreciated that the diode branch switches can be operated in a very low current regime which reduces the chance of their failing through excess heat dissipation. In the intended application to large area (e.g. 9"×9") high pel density (e.g. pel area of less than 25 mil sq.), fabrication of the thin film doide devices offers significant cost benefits over the film transistor switches since fabrication techniques for the latter are more complex and are characterized by poor yield. In addition, the fabrication techniques proposed are vastly preferred to silicon IC techniques, again because of cost and further because accurately planar glass substrate surfaces can be achieved which ensure little variation in LC cell thickness.

Although the embodiment described uses a twisted nematic LC, other examples may be used. For example, a cholesteric LC operated in a scattering mode is particularly applicable to a reflective display. As indicated previously, other electrooptic materials, for example, electrophoretic and electrochromic materials may also be used.

What is claimed is:

1. A display cell comprising a pair of plates at least one of the plates being transparent, the plates flanking an electro-optic material, the optical transmissivity of the material being dependent on potential difference applied across the material the display cell having a plurality of picture elements, each picture element defined by a pair of opposed electrodes on the inside faces of the respective plates with means for applying a voltage between the opposed electrodes of each element, each element being series connected to, and controlled by a respective switch element, switch elements each comprising two parallel branch of series-connected thin film diodes, the diodes of one of the branches having reverse polarity to the diodes of the other branch.

2. A liquid crystal display cell as claimed in claim 1, the picture elements and said switch elements being arranged in rows and columns, first lead means electrically connected one pole of each switch element to its series connected picture element, second lead means electrically connecting the other poles of the switch elements in rows, and third lead means electrically connecting the electrodes on the other plate in columns.

3. A liquid crystal display cell as claimed in claim 2, the diodes having top and bottom contact layers, the bottom contact layers and the electrodes on said one plate being formed simultaneously as a substantially transparent layer.

4. A liquid crystal display cell as claimed in claim 1, in which the diodes are homojunctions.

5. A liquid crystal display cell as claimed in claim 4, in which said diodes are hydrogenated amorphous silicon homojunctions.

6. A liquid crystal display cell as claimed in claim 1, in which the diodes are heterojunctions.

7. A liquid crystal display cell as claimed in claim 6, in which said diodes are $CdS$-$Cu_2S$ heterojunctions.

8. A liquid crystal display cell as claimed in claim 1, in which the diodes are metal-semiconductor junctions.

9. A liquid crystal display cell as claimed in claim 8, in which said diodes have a gold-CdSe junction.

10. A liquid crystal display cell as claimed in claim 1, in which the diodes are metal-insulator-semiconductor devices.

11. A liquid crystal display cell as claimed in claim 10, in which said insulator is $Al_2O_3$.

12. A liquid crystal display cell as claimed in claim 10, in which said insulator is CdTe.

* * * * *